March 9, 1965     J. CADIOU     3,173,039
DRIVING SYSTEMS FOR ELECTRIC GENERATORS
Filed July 5, 1961
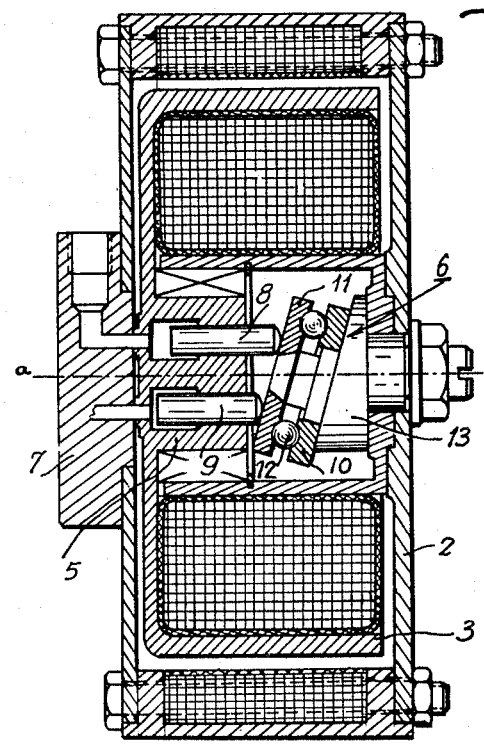
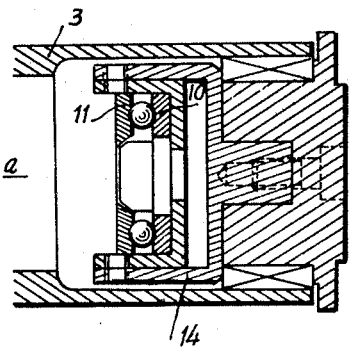
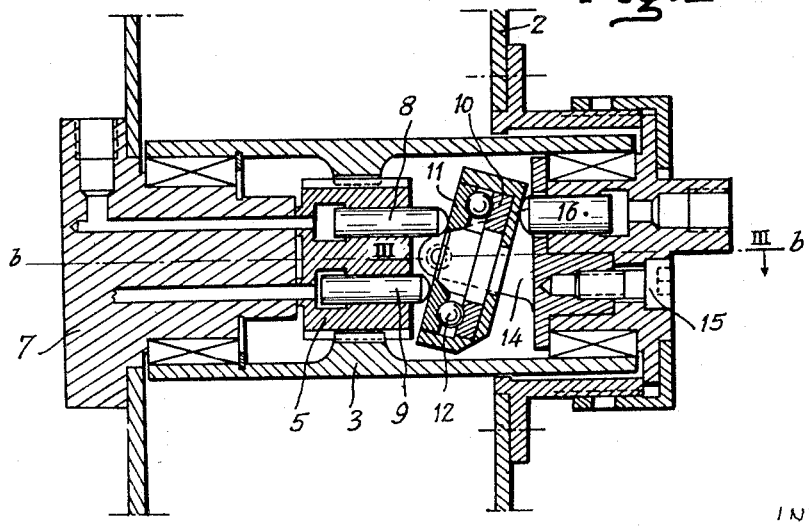
INVENTOR
JEAN CADIOU
ATTORNEYS

3,173,039
DRIVING SYSTEMS FOR ELECTRIC GENERATORS

Jean Cadiou, Paris, France, assignor to Societe Anonyme Andre Citroen, Paris, France, a French corporation
Filed July 5, 1961, Ser. No. 121,866
Claims priority, application France, July 6, 1960, 832,244
3 Claims. (Cl. 310—75)

An electric generator is necessarily driven by a motor and must in consequence be provided with a coupling, which imposes conditions of centering and alignment which can only be fulfilled by accurate machining of the parts which are to be coupled together.

In the case of generators which are adaptable to a vehicle motor, it is additionally necessary to provide and arrange the necessary emplacement on the motor to be equipped.

Furthermore, it will be necessary to provide means to be employed for the compensation, when so required, of the variation in speed of the motor, or to adapt the operation of the generator to the variable speeds of the motor. This involves the correct application of devices for regulating either the speed or the voltage or the output of the generator and the correct solution of this difficulty generally constitutes a problem difficult to resolve in a satisfactory manner.

The present invention provides a means for rendering the generator independent, both from the point of view of its operation and also as regards its position in the mechanical group considered.

The device contemplated can be produced without difficulty in all cases where there is available a source of fluid under pressure, such as is the case with certain vehicles. It is only necessary for the pressure of the fluid to be controlled and maintained at a substantially constant value for the independence of operation to be ensured. It is also not impossible, when starting from a variable pressure, to contemplate the means for regulating, at least in an approximate manner, the speed, the output, or any other characteristic of the generator in any suitable way.

An essential advantage of the invention is that it completely eliminates the necessity for mechanical coupling between the generator and its driving motor, due to the very fact that the latter is provided as an integral part of the said generator.

Finally, a further advantage resulting from the two above features is that the motor-generator group being only provided with fluid piping systems or electrical connections, forms a mechanically independent unit which can therefore be placed at any available point of the installation to be equipped and does not involve any particular emplacement difficulties.

The invention has for its object an electric generator-driving motor unit which is essentially characterized in that the rotor of the driving motor is driven by the action of a fluid under pressure and is housed inside the stator of the generator, while being directly coupled with or incorporated in the rotor of the generator.

In accordance with a preferred form of embodiment, the driving motor comprises a barrel with pistons, housed in the generator stator, and co-operating with an inclined impeller-plate, this barrel being supplied from a distributor of fluid under a controlled pressure.

The invention will be better understood by means of the description which follows and with reference to the accompanying drawings, in which the same reference numbers are given to similar parts.

FIG. 1 shows a cross-section in a plane passing through the axis of symmetry $a$—$a$ of a generator-driving motor unit in accordance with the invention.

FIGS. 2 and 3 show an alternative form of embodiment in which the driving motor has a variable cylinder capacity.

In FIG. 2, the unit is shown in cross-section taken along a plane passing through the axis of symmetry $b$—$b$.

FIG. 3 is a view partially in cross-section along an axial plane perpendicular to that preceding.

In the accompanying drawings, the generator has been shown very diagrammatically, and it will only be indicated that it comprises a stator 2 and a rotor 3 without defining its structure and without any limitation as to its type.

In the preferred example of construction shown, it can be seen that the driving motor comprises a non-rotating impeller-plate 6, a rotary piston barrel 5 and a fixed distributor 7.

The barrel 5 is coupled to or incorporated with the rotor 3 of the generator, which eliminates all mechanical coupling between the generator and the motor.

In this way, the difficulties of centering and alignment inherent in the conventional solutions are eliminated, including the coupling between the generator and the motor, at the same time considerably reducing the overall size of the unit.

The operation of the device is as follows:

When one of the pistons of the barrel, such as 8, is subjected by the distributor to the action of the fluid under pressure, it reecives from the impeller plate, by reason of the inclination of this latter, a reaction to the pressure force applied by the fluid which includes a tangential component tending to drive the barrel in rotation.

This tangential component would have a tendency to rotate the barrel in the opposite direction when the piston moves farther in, as shown at 9, but in fact, as the pressure is then replaced by a suction as a result of an appropriate arrangement of the distributor, the reaction is then cancelled.

The impeller-plate 6 comprises a fluid bowl 10 and a moving bowl 11, between which is provided a ring of balls 12.

In the form of construction of FIG. 1, the fixed bowl 10 is made a driving fit on a thrust supporting member 13 fixed to the generator stator.

In the alternative form of FIGS. 2 and 3, the ball thrust bearing is supported by a fork 14 fixed to the stator of the generator by a screw 15. In addition, the said thrust bearing is applied on a piston 16 (FIG. 2) which enables its inclination to be varied, which causes a variation in the output of the motor.

It should be observed that in the two forms of construction described, it is possible to obtain a regulation of the conditions of operation of the generator and of the desired characteristics. In the first case, the parameter is the pressure of the fluid and in the second case the parameters are the pressure and the inclination of the plate.

It will of course be understood that numerous modifications can be envisaged by persons skilled in the art, without thereby departing from the scope of the invention.

I claim:

1. A combined electric generator-driving motor unit particularly for motor vehicles comprising a generator having a stator and a rotor, a driving motor having a rotor driven by the action of a fluid under pressure housed inside the stator of said generator, means coupling said motor rotor with the rotor of said generator, said driving motor comprising a piston barrel housed inside said stator of the generator, an inclined impeller-plate cooperating with said barrel and a distributor for supplying fluid under controlled pressure to said barrel.

2. A combined electric generator-driving motor unit, in accordance with claim 1, in which said impeller-plate is supported on a piston controlled by the fluid which gives the impeller-plate a variable inclination.

3. A combined electric generator-driving motor unit, in accordance with claim 1, in which means are provided to vary the pressure of the fluid to regulate the characteristics of the generator.

References Cited by the Examiner

UNITED STATES PATENTS 2,353,730   7/44   Joy _____ 121—62

MILTON O. HIRSHFIELD, *Primary Examiner.*